(12) United States Patent
Goto

(10) Patent No.: US 6,982,759 B2
(45) Date of Patent: Jan. 3, 2006

(54) AMPLIFICATION TYPE SOLID-STATE IMAGING DEVICE HAVING A POTENTIAL DETECTING CIRCUIT FOR EACH UNIT CELL AND HIGH-SPEED READOUT METHOD THEREOF

(75) Inventor: Hiroshige Goto, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 905 days.

(21) Appl. No.: 09/816,518

(22) Filed: Mar. 26, 2001

(65) Prior Publication Data

US 2001/0026321 A1 Oct. 4, 2001

(30) Foreign Application Priority Data

Mar. 29, 2000 (JP) .................................... 2000-090061

(51) Int. Cl.
*H04N 3/14* (2006.01)
*H04N 5/335* (2006.01)

(52) U.S. Cl. .................. 348/302; 348/304; 348/308
(58) Field of Classification Search ................ 348/294, 348/297, 298, 300, 301, 302, 303, 307, 311, 348/312, 308, 314
See application file for complete search history.

(56) References Cited

U.S. PATENT DOCUMENTS

| 5,262,871 | A | * | 11/1993 | Wilder et al. ............... 348/307 |
| 5,818,526 | A | * | 10/1998 | Nomoto ...................... 348/302 |
| 6,005,237 | A | | 12/1999 | Matsunaga |
| 6,091,449 | A | * | 7/2000 | Matsunaga et al. .......... 348/308 |
| 6,352,869 | B1 | * | 3/2002 | Guidash ....................... 438/16 |
| 6,507,365 | B1 | * | 1/2003 | Nakamura et al. .......... 348/296 |
| 6,512,545 | B1 | * | 1/2003 | Mizoguchi et al. .......... 348/304 |
| 6,657,177 | B2 | * | 12/2003 | Goto ........................... 348/302 |
| 6,657,665 | B1 | * | 12/2003 | Guidash ...................... 348/308 |
| 6,674,470 | B1 | * | 1/2004 | Tanaka et al. ............... 348/302 |
| 6,697,114 | B1 | * | 2/2004 | Merrill ........................ 348/308 |
| 6,714,239 | B2 | * | 3/2004 | Guidash ................... 348/223.1 |

FOREIGN PATENT DOCUMENTS

| JP | 5-328224 | 10/1993 |
| JP | 8-182005 | 7/1996 |
| JP | 10-150182 | 2/1998 |
| JP | 10-4520 | 6/1998 |

OTHER PUBLICATIONS

Patent Abstracts of Japan, JP 10–004520, Jan. 6, 1998.
Patent Abstracts of Japan, JP 08–111517, Apr. 30, 1996.
Patent Abstracts of Japan, JP 11–136558, May 21, 1999.
Patent Abstracts of Japan, JP 03–003577, Jan. 9, 1991.
Patent Abstracts of Japan, JP 03–013079, Jan. 22, 1991.

* cited by examiner

*Primary Examiner*—Aung Moe
(74) *Attorney, Agent, or Firm*—Oblon, Spivak, McClelland, Maier & Neustadt, P.C.

(57) ABSTRACT

A solid-state imaging device comprising an imaging area having unit cells, a vertical driving circuit, signal processing circuits, a horizontal driving circuit, and an output circuit. Each of the unit cells including first and second photoelectric conversion/storage sections, first and second charge readout circuits, a potential detecting circuit, a reset circuit, and an address circuit. The solid-state imaging device has a first operation mode in which the first and second charge readout circuits are driven at substantially the same timing by the vertical driving circuit, the charges stored in the first and second photoelectric conversion/storage sections are transferred to and added together in the charge detecting section, and the potential detecting circuit detects the added charges, generates and transmits a potential corresponding to an amount of detected charges to the vertical signal line, and outputs the potential from the output circuit via the signal processing circuits.

5 Claims, 10 Drawing Sheets

AMPLIFICATION TYPE SOLID-STATE IMAGING DEVICE HAVING A POTENTIAL DETECTING CIRCUIT FOR EACH UNIT CELL AND HIGH-SPEED READOUT METHOD THEREOF

CROSS-REFERENCE TO RELATED APPLICATIONS

This application is based upon and claims the benefit of priority from the prior Japanese Patent Application No. 2000-090061, filed Mar. 29, 2000, the entire contents of which are incorporated herein by reference.

BACKGROUND OF THE INVENTION

This invention relates to a so-called amplification type solid-state imaging device having a potential detecting circuit for each unit cell and a high-speed readout method thereof and more particularly to a solid-state imaging device which is operated at high speed while suppressing a lowering in the signal-noise ratio (S/N ratio).

Recently, solid-state imaging devices which are called amplification type solid-state imaging devices each having a potential detecting circuit for each unit cell are actively developed. In comparison with a CCD type solid-state imaging device conventionally used, since the charge transfer operation is effected only in an area around the photodiodes in this type of solid-state imaging device, the power and voltage required for the charge transfer operation become unnecessary and it is advantageously used for mobile applications in which it is driven by a battery or the like. In this case, however, there occurs a problem that the S/N ratio is lowered by a variation in the characteristic of the potential detecting circuit provided for each unit cell and studies on this matter are actively continued.

FIG. 1 shows the schematic construction of the in amplification type solid-state imaging device. In FIG. 1, an example of the solid-state imaging device Ad having two photodiodes arranged in each unit cell is shown.

In an imaging area on a semiconductor substrate, unit cells are arranged in a two-dimensional fashion. More precisely, the unit cells are arranged in i rows and j columns, where i and j are integers. Of these unit cells, six representative ones are illustrated in FIG. 1. The six unit cells P are arranged in two adjacent rows m and m+1 and three adjacent columns n−1, n and n+1; they are located at intersections (m, n−1), (m, n), (m, n+1), (m+1, n−1), (m+1, n) and (m+1, n+1).

An address pulse line LADi, first and second readout pulse lines LR1i, LR2i and reset pulse line LRSi are arranged in the horizontal direction for each pixel row of the unit cells P(i,j). The unit cells P(i,j) are supplied with an address pulse φADi, first and second readout pulses φR1i, φR2i, and reset pulse φRSi from a pulse generating section 20 via the address pulse line LADi, first and second readout pulse lines LR1i, LR2i and reset pulse line LRSi.

Further, a vertical signal line Sj is provided in the vertical direction for each column of the unit cells P(i,j). A current source Ij is provided between one end of each of the vertical signal lines Sj and the ground node. The other end of each vertical signal line Sj is connected to one end of the current path of a shift transistor (shift gate) SRj. The gates of the shift transistors SHj are commonly connected to a shift pulse line LSH.

One electrode of each coupling capacitor (capacitance) CAj is connected to the other end of the current path of the shift transistor SHj and the current path of a horizontal readout transistor (horizontal readout gate) Hj is connected between the other electrode of a corresponding one of the capacitors CAj and a horizontal signal line 24. The gate of the horizontal readout transistor Hj is connected to a corresponding one of horizontal readout pulse lines LHj. A capacitor which is equivalently represented by a capacitor 25 is associated with the horizontal signal line 24.

Charge storage capacitors (capacitances) CBj are respectively connected between the other electrodes of the capacitors CAj and the ground node. The current paths of clamping transistors (clamping gates) CLPj for offset elimination are respectively connected between connection nodes of the capacitors CAj and CBj and the positive terminal of a clamping DC power supply 23. The gates of the transistors CLPj are connected to a clamp line LCLP.

The shift transistor SHj, capacitors CAj, CBj and clamping transistor CLPj constitute a noise canceller circuit.

A pulse generating section 21 supplies a shift pulse φSH to the gates of the shift transistors SHj via the shift pulse line LSH and supplies a clamp pulse φCLP to the gates of the clamping transistors CLPj via the clamp pulse line LCLP to control the operations thereof.

Further, a pulse generating section 22 respectively supplies horizontal readout pulses φHj to the gates of the horizontal readout transistors Hj via the horizontal readout pulse lines LHj and supplies a clear pulse φCR to the gate of a potential resetting transistor (potential resetting gate) 28 via a clear pulse line LCR. The potential resetting transistor 28 is used for resetting the potential of the capacitor (capacitance) 25, and one end of the current path thereof is connected to the positive terminal of a DC power supply 29 for generating a potential at the reset time and the other end of the current path thereof is connected to the horizontal signal line 24. The voltage value (which is indicated by Vb) of the DC power supply 29 is determined by taking the characteristic of an output buffer circuit 26 into consideration and the clear pulse φCR is supplied to the gate of the transistor 28 to set the potential of the capacitor 25 to the potential Vb before the horizontal readout pulses φHj are supplied.

The horizontal signal line 24 is connected to the input terminal of the output buffer circuit 26 for detecting the potential of the horizontal signal line 24, subjecting the potential to impedance conversion and outputting the potential to the exterior. The output end of the output buffer circuit 26 is connected to an output terminal 27.

Next, the internal construction of the unit cell P(i,j) is explained. In FIG. 1, the unit cell P(m, n−1) is taken as an example and shown in detail, but the other unit cells are also constructed in the same manner. Each unit cell P(i,j) includes photodiodes 1—1, 1-2, readout transistors (readout gates) 2-1, 2—2, reset transistor (reset gate) 4, potential detecting transistor (potential detecting gate) 5, address transistor (address gate) 6 and the like.

The anodes of the photodiodes 1—1, 1-2 are grounded and the cathodes thereof are respectively connected to one-side ends of the current paths of the readout transistors 2-1, 2—2. The other ends of the current paths of the readout transistors 2-1, 2—2 are connected to a storage node 3 (common charge detecting section) in which charges read out from the photodiodes 1—1, 1-2 are temporarily stored and the gates thereof are respectively connected to the readout pulse lines LR1i, LR2i. The reset transistor 4 is connected between the storage node 3 and a power supply 7 and the gate of the reset transistor 4 is connected to a corresponding one of the reset pulse lines LRSi. One end of the current path of the potential detecting transistor 5 is connected to a corresponding one of the vertical signal lines Sj via the output line. 8 of the corresponding unit cell P(i,j) and the gate thereof is connected to the storage node 3. The potential detecting transistor 5 is used for detecting the charges transferred to the storage node 3 and transmits a potential corresponding to an amount of detected charges to the vertical signal line Sj via the output line 8. The current path of the address transistor 6 is connected between the other end of the current path of the potential detecting transistor 5 and the power supply 7 and the gate thereof is connected to the address pulse line LADi. The address transistor 6 is used for activating the potential readout operation for the corresponding unit cell P(i,j). In FIG. 1, in order to clarify the drawing, power supply lines are omitted.

With the above construction, part of the circuit elements of the unit cell can be commonly used for the photodiodes 1—1, 1-2 and the integration density can be enhanced. However, since the symmetry of the circuit arrangement and pattern arrangement of the surrounding portions of the photodiodes 1—1, 1-2 cannot be maintained, the tolerance for the mask alignment in the manufacturing process becomes severe. That is, the manufacturing technique and the integration density are set in the trade-off relation.

Next, the operation of the amplification type solid-state imaging device shown in FIG. 1 is explained with reference to the timing charts shown in FIGS. 2 and 3. FIG. 2 shows pulse timings for driving the amplification type solid-state imaging device and FIG. 3 shows the relation between the horizontal readout pulses $\phi H1, \phi H2, \phi H3, \ldots$ and the clear pulse $\phi CR$.

In FIGS. 2 and 3, a standard television system is assumed. In FIG. 2, HBLK indicates a horizontal sync. pulse and the high-level period is a horizontal scanning retrace interval. The low-level period of the horizontal sync. pulse HBLK is a horizontal effective scanning period and a horizontal readout pulse $\phi Hj$ is generated during this period. The horizontal scanning retrace interval and the horizontal effective scanning period constitute one horizontal scanning period (1H). In the horizontal scanning period, each signal readout operation from each of the unit cells is effected during the horizontal scanning retrace interval and the readout signal is stored in the capacitor CBj in the form of charges. After this, the horizontal readout transistors Hj are sequentially turned ON in the horizontal effective scanning period to connect the capacitor 25 in parallel with the capacitors CAj, CBj, thereby reading out the stored signal charges. The signal readout operation in this period is commonly effected for the unit cells arranged in the horizontal direction.

Next, the above readout operation is explained in more detail by taking the photodiodes 1—1 of the unit cell P(m, n–1) as an example. Charges created by photoelectrically converting light incident on the photodiode 1—1 are stored in the photodiode 1—1 until the readout transistor 2-1 is turned ON. The operation which is first effected in the horizontal scanning retrace interval is to set the address pulse $\phi ADm$ to the high level so as to turn ON the address transistor 6 (t=t0) and construct a source-follower circuit by use of the vertical signal line Sn-1, current source In-1 and potential detecting transistor 5 so that the charge of the storage node 3 can be detected by use of the potential detecting transistor 5. As a result, only a potential corresponding to the charge amount of the storage node 3 and determined by the gate potential of the potential detecting transistor 5 is transmitted to the vertical signal line Sn-1.

Further, a dark current integrated value stored in the storage node 3 can be discharged by setting the reset pulse $\phi RSm$ to the high level to turn ON the reset transistor 4 at the beginning of the horizontal scanning retrace interval. Thus, the storage node 3 can be set at the power supply voltage value (which is denoted by Vdd).

It is now assumed that the capacitance of the storage node 3 is Cij when the charge Q is transferred from the photodiode 1—1 to the storage node 3. Then, the potential V3 of the storage node 3 can be expressed by the following equation (1).

$$V3 = Vdd + Q/Cij \qquad (1)$$

where Vdd is a power supply voltage.

When the above value is detected by the potential detecting transistor 5, the potential V8 of the output line 8 takes a value expressed by the following equation (2).

$$\begin{aligned} V8 &= mV3 + V0 \\ &= m(Vdd + Q/Cij) + V0 \\ &= mQ/Cij + mVdd + V0 \end{aligned} \qquad (2)$$

where m is the modulation degree of the transistor and V0 is an offset voltage determined by variations in the current source In-1 and the threshold voltage of the potential detecting transistor 5.

In the present manufacturing technology, the modulation degree m can be suppressed to a small variation for the entire surface of the wafer, but the offset voltage V0 cannot be always suppressed to a small variation and is considered as an amount which varies depending on the vertical signal lines. Therefore, the modulation degree m can be regarded as being constant, but it is necessary to correct the offset voltage V0. The correction is made in the next operation.

The potential V8 of the output line 8 and the potential VA of a node NA which is a connection node of the capacitors CAj and CBj in the noise canceller circuit are considered while it is assumed that the potential of the DC power supply 23 is Vref. It is supposed that V8 is expressed by the following equation (3) at the time t=t1 immediately after the resetting operation.

$$V8 = mVdd + V0 = V1 \qquad (3)$$

After this, at the time t=t2 immediately after application of the clamp pulse $\phi CLP$, the potential V8 of the output line 8 is kept at V1, but VA is set to a value expressed as follows.

$$VA = Vref \qquad (4)$$

That is, a potential difference (Vref–V1) appears across the capacitor CAn-1. The potential of the electrode of the capacitor CBn-1 opposite to the electrode thereof which is grounded is set to a potential of Vref. Next, the readout pulse $\phi R1m$ is set to the high level to turn ON the readout transistor 2-1 so that the charge Q stored in the photodiode 1—1 can be transferred to the storage node 3. As a result, at the time t=t3, V8 is set to the following value.

$$V8 = mQ/Cij + V1 \qquad (5)$$

Therefore, the potential VA of the node NA is set to a voltage expressed by the following equation (6).

$$VA = Vref + mQ/Cij \cdot CAj/(CAj + CBj) \qquad (6)$$

After this, the shift pulse $\phi SH$ is set to the low level to turn OFF the shift transistor SHn-1 and separate the vertical signal line Sn-1. If charges stored in the capacitor 25 and capacitor CBj in this state (t=t4) are respectively indicated by Q1, Q2 and when the capacitance of the capacitor 25 is CH and the voltage value of the DC power supply 29 is Vb, then the charges Q1, Q2 are expressed by the following equations (7) and (8).

$$Q1 = CH \cdot Vb \tag{7}$$

$$Q2 = CBjVref + mQ/Cij \cdot CAjCBj/(CAj+CBj) \tag{8}$$

If the horizontal readout pulse φHn-1 is set to the high level to turn ON the horizontal readout transistor Hn-1, the capacitors are connected in parallel and the potential of the horizontal signal line 24 is set to a value expressed by the following equation (9).

$$(Q1 + Q2)/(CH + CBj) = \tag{9}$$
$$(CH \cdot Vb + CBjVref)/(CH + CBj) + mQ/Cij \cdot CAjCBj/(CAj + CBj)$$

After this, as shown in the timing chart of FIG. 3, the clear pulse φCR is set to the high level in the low-level period of the horizontal sync. pulse HBLK and then a corresponding one of the horizontal readout pulses φH1, φH2, φH3, . . . is sequentially set to the high level so as to change the potential of the horizontal signal line 24 and thus perform the readout operation.

As is clearly understood from the equation (9), the potential of the horizontal signal line 24 contains a single constituent factor except that it contains the capacitances CAj, CBj as an amount which may vary for each line and Cij which may vary for each unit cell. That is, it does not contain V0 shown in the equation (3) and varying according to the threshold voltage or the like and is effectively corrected based on the value of the potential V8 of the output line 8.

Further, it is understood by specifically studying the equation (9) that the potential is determined not by the absolute values of the capacitances but by the ratios thereof except the item of mQ/Cij. This means that the output voltage is determined not by the absolute value of the film thickness of the gate oxide film, for example, but by the ratio of the geometrical sizes of the patterns of the capacitors and a reduction in the variation can be relatively easily attained by the present manufacturing technology. Since the modulation degree m of the transistor is a relatively easily controllable variable, can be attained with a less variation as described before and can be regarded as being substantially constant, the potential is slightly influenced only by Cij acting as an amount which may vary for each unit cell.

Basically, it is considered to reduce the number of photodiodes used for charge readout in order to drive the solid-state imaging device with the construction as shown in FIG. 1 at high speed.

The operation timings used for attaining the high-speed operation are shown in FIGS. 4 and 5. FIG. 4 shows the operation timing used when only one of the two photodiodes in each unit cell is used for the readout operation. In the operation timing shown in FIG. 4, signal charges are read out only from the photodiode 1—1 and charges stored in the photodiode 1-2 are discharged via the storage node 3 by supplying the readout pulse φR2m in synchronism with the reset pulse φRSm to simultaneously turn ON the reset transistor 4 and readout transistor 2—2. As a result, the readout speed for one frame is enhanced to twice the normal readout speed.

FIG. 5 is a timing chart wherein the same idea is applied to a pixel column, the readout operation is effected only for the even columns without effecting, the readout operation for the odd columns. That is, the horizontal readout pulses φH1, φH3, φH5, . . . for the odd columns are fixed at the low level and the horizontal readout pulses φH2, φH4, φH6, . . . for the even columns are sequentially set to the high level to perform the readout operation. As a result, the readout speed for one frame can be enhanced to twice the normal readout speed.

However, the improvement of the operation speed by the above methods is accompanied by a lowering in the S/N ratio. That is, the S/N ratio may be easily lowered since the number of photodiodes used for the readout operation is reduced to half the number of photodiodes used in the normal driving operation.

BRIEF SUMMARY OF THE INVENTION

According to an aspect of the present invention, there is provided a solid-state imaging device that includes an imaging area having unit cells arranged in a two-dimensional fashion on a semiconductor substrate, each of the unit cells including first and second photoelectric conversion/storage sections for photoelectrically converting incident light and storing charges thus generated, first and second charge readout circuits for transferring charges stored in the first and second photoelectric conversion/storage sections to a commmon charge detecting section, a potential detecting circuit for detecting charges transferred to the charge detecting section, generating a potential corresponding to an amount of charges and transmitting the potential to a corresponding one of vertical signal lines, a reset circuit for discharging the charge transferred to the charge detecting section, and an address circuit for selectively activating the potential detecting circuit; a vertical driving circuit provided in correspondence to each pixel row of the imaging area, for driving the first and second charge readout circuits, reset circuit and address circuit of each of the unit cells at preset timings; signal processing circuits respectively attached to the vertical signal lines which are respectively provided for columns of the unit cells, for performing required signal processes; a horizontal driving circuit for scanning outputs of the signal processing circuits in a horizontal direction at preset timings to detect the same; and an output circuit for outputting output signals of the signal processing circuits detected by the scanning operation by the horizontal driving circuit; wherein the solid-state imaging device has a first operation mode in which the first and second charge readout circuits are driven at substantially the same timing by the vertical driving circuit, the charges stored in the first and second photoelectric conversion/storage sections are transferred to and added together in the charge detecting section, and the potential detecting circuit detects the added charges, generates and transmits a potential corresponding to the amount of the detected charges to the vertical signal line, and outputs the potential from the output circuit via the signal processing circuits.

According to another aspect of the present invention, there is provided a readout method of a solid-state imaging device which includes an imaging area having unit cells arranged in a two-dimensional fashion on a semiconductor substrate, each of the unit cells including first and second photoelectric conversion/storage sections for photoelectrically converting incident light and storing charges thus generated, first and second charge readout circuits for transferring charges stored in the first and second photoelectric conversion/storage sections to a common charge detecting section, a potential detecting circuit for detecting charges transferred to the charge detecting section, generating a potential corresponding to an amount of detected charges and transmitting the potential to a corresponding one of vertical signal lines, a reset circuit for discharging the charges transferred to the charge detecting section, and an address circuit for selectively activating the potential detecting circuit, a vertical driving circuit provided in correspondence to each pixel row of the imaging area, for driving the first and second charge readout circuits, reset circuit and address circuit of each of the unit cells at preset timings, signal processing circuits respectively attached to the vertical signal lines which are respectively provided for columns of the unit cells, for performing required signal processes; a horizontal driving circuit for scanning outputs of the signal processing circuits in a horizontal direction at preset timings to detect the same, and an output circuit for outputting output signals of the signal processing circuits detected by the scanning operation by the horizontal driving circuit, the method including driving the first and second charge readout circuits at substantially the same timing by use of the vertical driving circuit; transferring the charges stored in the first and second photoelectric conversion/storage sections to the charge detecting section and adding the charges together; detecting the added charges by use of the potential detecting circuit; generating a potential corresponding to an amount of the detected charges and transmitting the potential to the vertical signal line; and outputting the potential from the output circuit via the signal processing circuits.

BRIEF DESCRIPTION OF THE SEVERAL VIEWS OF THE DRAWING

FIG. 11 is a timing chart for illustrating the readout operation of the solid-state imaging device according to the third embodiment of this invention.

DETAILED DESCRIPTION OF THE INVENTION

[First Embodiment]

Figure 1:
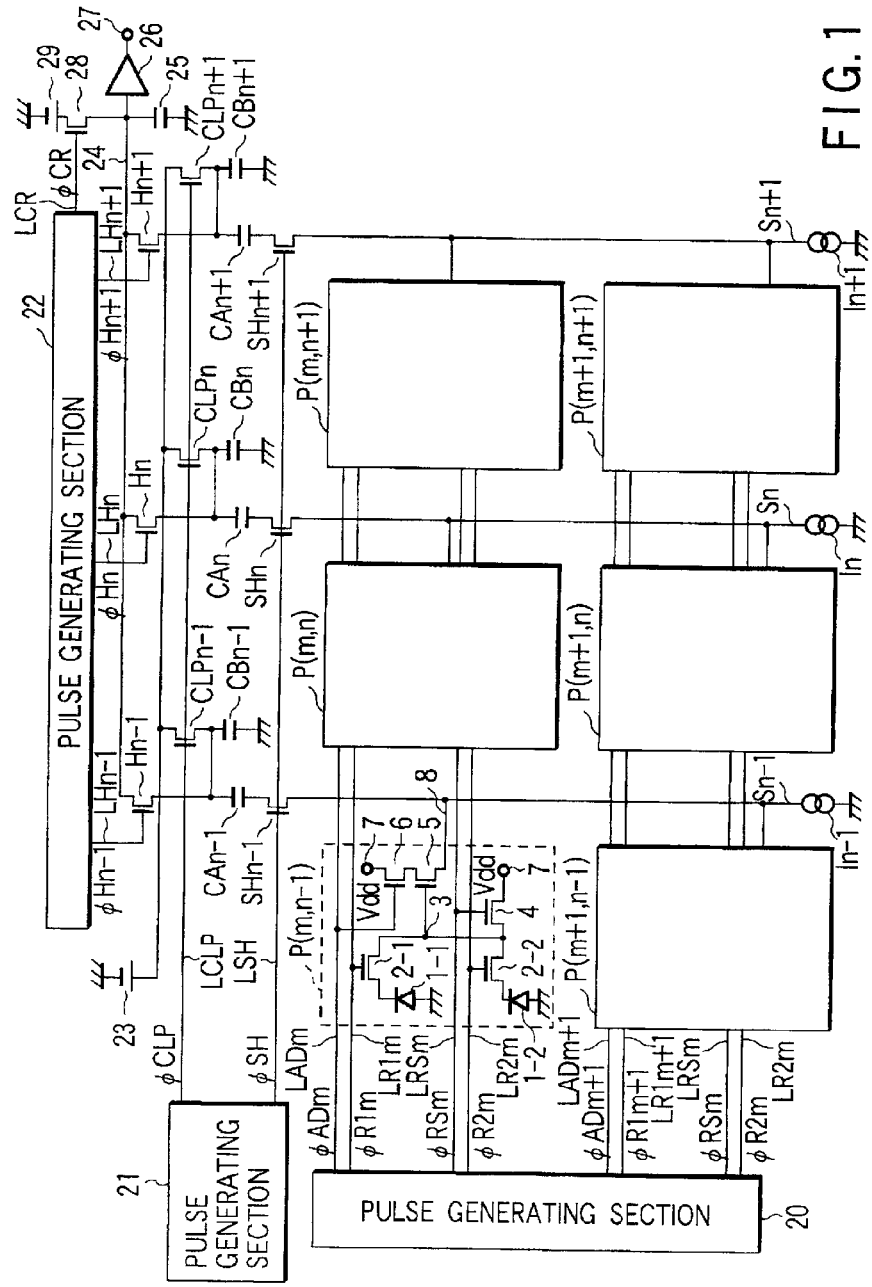
FIG. 1 is a circuit diagram for illustrating the conventional solid-state imaging device.
Figure 6:
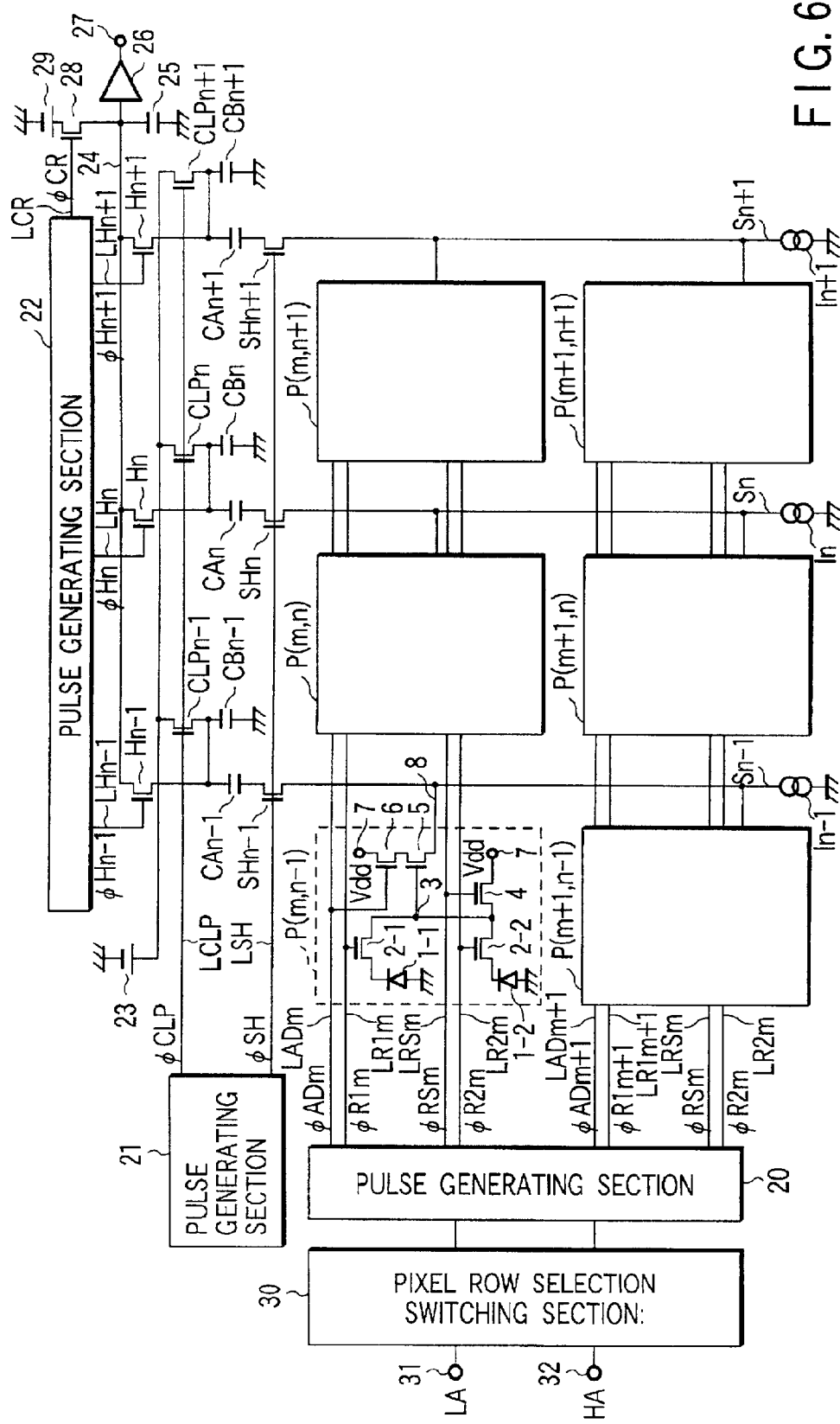
FIG. 6 is a circuit diagram for illustrating a solid-state imaging device according to a first embodiment of this invention.

FIG. 6 is a circuit diagram showing the construction of a solid-state imaging device according to one embodiment of this invention. Like the case of FIG. 1, in FIG. 6, a solid-state imaging device having two photodiodes arranged in each unit cell is taken as an example.

Unit cells are arranged in a two-dimensional fashion in an imaging area on a semiconductor substrate. More precisely, the unit cells are arranged in i rows and j columns, where i and j are integers. Of these unit cells, six representive ones are illustrated in FIG. 6. The six unit cells P are arranged in two adjacent rows m and m+1 and three adjacent columns n−1, n and n+1; they are located at intersections (m, n−1), (m, n), (m, n+1), (m+1, n−1), (m+1, n) and (m+1, n+1).

An address pulse line LADi, first and second readout pulse lines LR1i, LR2i and reset pulse line LRSi are arranged in the horizontal direction for each pixel row of the unit cells P(i,j). The unit cells P(i,j) are supplied with an address pulse $\phi$ADi, first and second readout pulses $\phi$R1i, $\phi$R2i, and reset pulse $\phi$RSi from a pulse generating section 20 used as a vertical driving circuit via the address pulse line LADi, first and second readout pulse lines LR1i, LR2i and reset pulse line LRSi. An output signal of a pixel row selection switching circuit 30 is supplied to the pulse generating section 20. The pixel row selection switching circuit 30 controls the pulse generating section 20 based on a signal LA for specifying a high-resolution mode and a signal HA for specifying a high-speed driving mode which are respectively supplied to input terminals 31 and 32. With this connection, readout pulses $\phi$R1i, $\phi$R2i of different timings in the high-resolution mode and high-speed driving mode are output from the pulse generating section 20.

Further, vertical signals line Sj are respectively provided in the vertical direction for columns of the unit cells P(i,j). Current sources Ij are respectively provided between one-side ends of the vertical signal lines Sj and the ground node. The other ends of the vertical signal lines Sj are respectively connected to one-side ends of the current paths of shift transistors (shift gates) SHj. The gates of the shift transistors SHj are commonly connected to a shift pulse line LSH.

One-side electrodes of coupling capacitors (capacitances) CAj are respectively connected to the other ends of the current paths of the shift transistors SHj and the current paths of horizontal readout transistors (horizontal readout gates) Hj used as horizontal readout switching circuits are respectively connected between the other electrodes of the capacitors CAj and a horizontal signal line 24. The gates of the horizontal readout transistors Hj are respectively connected to horizontal readout pulse lines LHj. A capacitor which is equivalently represented by a capacitor 25 is associated with the horizontal signal line 24.

Charge storage capacitors (capacitances) CBj are respectively connected between the other electrodes of the capacitors CAj and the ground node. The current paths of clamping transistors (clamping gates) CLPj for offset elimination are respectively connected between connection nodes of the capacitors CAj and CBj and the positive terminal of a clamping DC power supply 23. The gates of the transistors CLPj are connected to a clamp line LCLP.

The shift transistor SHj, capacitors CAj, CBj and clamping transistor CLPj constitute a noise canceller circuit used as a signal processing circuit.

A pulse generating section 21 supplies a shift pulse $\phi$SH to the gates of the shift transistors SHj via the shift pulse line LSH and supplies a clamp pulse φCLP to the gates of the clamping transistors CLPj via the clamp pulse line LCLP to control the operations thereof.

Further, a pulse generating section 22 used as a horizontal driving circuit supplies horizontal readout pulses φHj to the gates of the respective horizontal readout transistors Hj via the horizontal readout pulse lines LHj and supplies a clear pulse φCR to the gate of a potential resetting transistor (potential resetting gate) 28 via a clear pulse line LCR. The potential resetting transistor 28 is used for resetting the potential of a capacitor (capacitance) 25, and one end of the current path thereof is connected to the positive terminal of a DC power supply 29 for generating a potential at the reset time and the other end of the current path thereof is connected to the horizontal signal line 24. The voltage value (which is indicated by Vb) of the DC power supply 29 is determined by taking the characteristic of an output buffer circuit 26 into consideration and the clear pulse φCR is supplied to the gate of the transistor 28 to set the potential of the capacitor 25 to the potential Vb before the horizontal readout pulses φHj are supplied.

The horizontal signal line 24 is connected to the input terminal of the output buffer circuit 26 used as an output circuit for detecting the potential of the horizontal signal line 24, subjecting the potential to impedance conversion and outputting the potential to the exterior. The output end of the output buffer circuit 26 is connected to an output terminal 27.

Next, the internal construction of the unit cell P(i,j) is explained. In FIG. 6, the unit cell P(m, n−1) is taken as an example and shown in detail, but the other unit cells are also constructed in the same manner. Each unit cell P(i,j) includes photodiodes 1—1, 1-2 as photoelectric conversion/storage sections, readout transistors (readout gates) 2-1, 2—2 as charge readout circuits, reset transistor (reset gate) 4 as a reset circuit, potential detecting transistor (potential detecting gate) 5 as a potential detecting circuit, address transistor (address gate) 6 as an address circuit and the like.

The anodes of the photodiodes 1—1, 1-2 are grounded and the cathodes thereof are respectively connected to one-side ends of the current paths of the readout transistors 2-1, 2—2. The other ends of the readout transistors 2-1, 2—2 are connected to a storage node 3 (common charge detecting section) in which charges read out from the photodiodes 1—1, 1-2 are temporarily stored and the gates thereof are respectively connected to the readout pulse lines LR1i, LR2i. A reset transistor 4 is connected between the storage node 3 and a power supply 7 and the gate of the reset transistor 4 is connected to a corresponding one of the reset pulse lines LRSi. One end of the current path of the potential detecting transistor 5 is connected to a corresponding one of the vertical signal lines Sj via the output line 8 of the corresponding unit cell P(i,j) and the gate thereof is connected to the storage node 3. The potential detecting transistor 5 is used for detecting the charges transferred to the storage node 3 and transmits a potential corresponding to an amount of detected charges to the corresponding vertical signal line Sj via the output line 8. The current path of the address transistor 6 is connected between the other end of the current path of the potential detecting transistor 5 and the power supply 7 and the gate thereof is connected to a corresponding ok one of the address pulse lines LADi. The address transistor 6 is used for activating the potential readout operation of the corresponding unit cell P(i,j). In FIG. 6, in order to clarify the drawing, power supply lines are omitted.

In the first embodiment, the timings of pulse signals supplied to the respective unit cells P(i,j) from the pulse generating section 20 are changed by supplying a signal LA for specifying the high-resolution mode or a signal HA for specifying the high-speed driving mode to the input terminal 31 or 32 so as to cause the pixel row selection switching section 30 to control the pulse generating section 20 and thus the high-resolution mode and high-speed driving mode are selectively switched.

Figure 2:
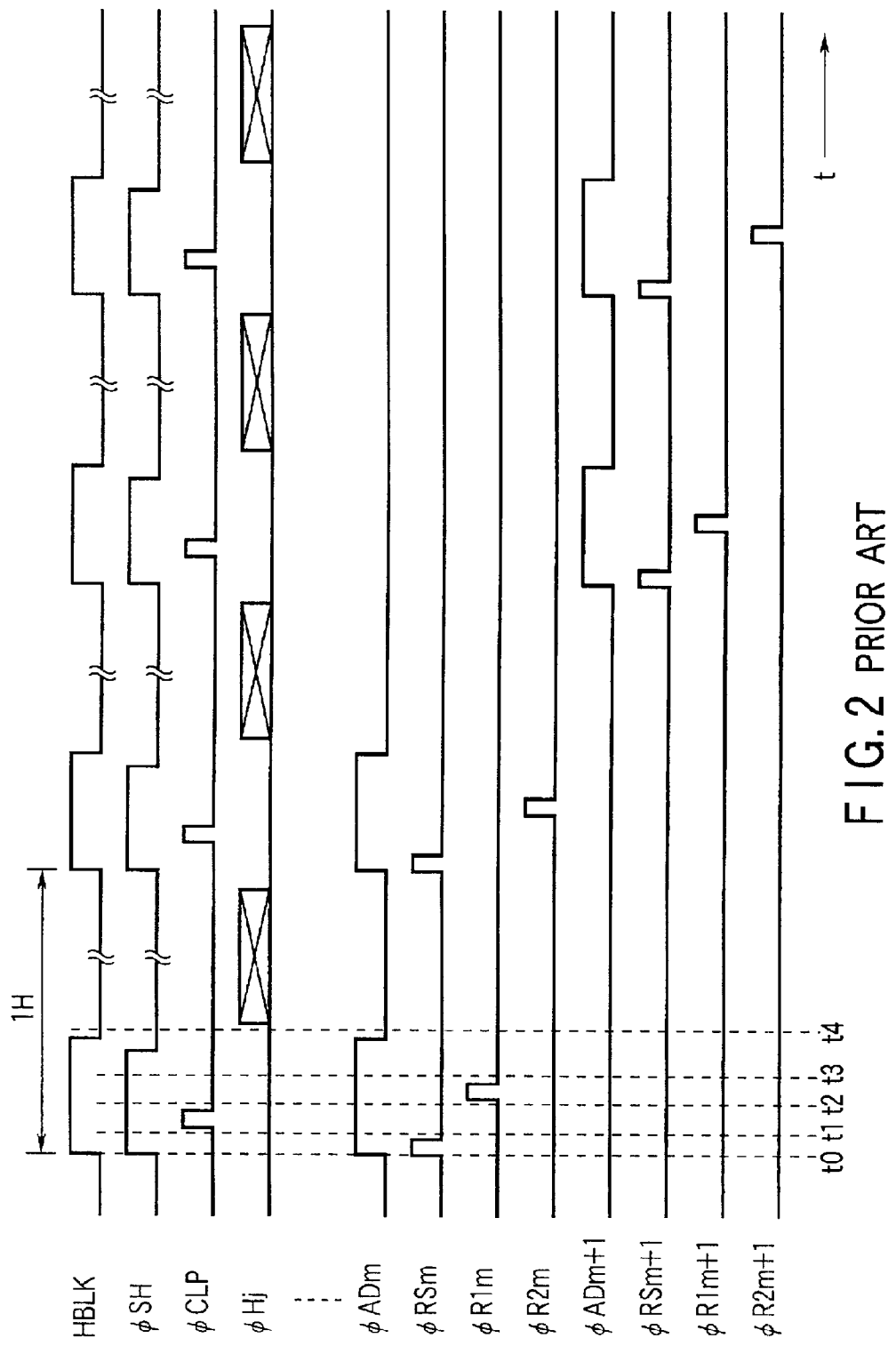
FIG. 2 is a timing chart showing conventional pulse timings used for driving the solid-state imaging device shown in FIG. 1.
Figure 3:
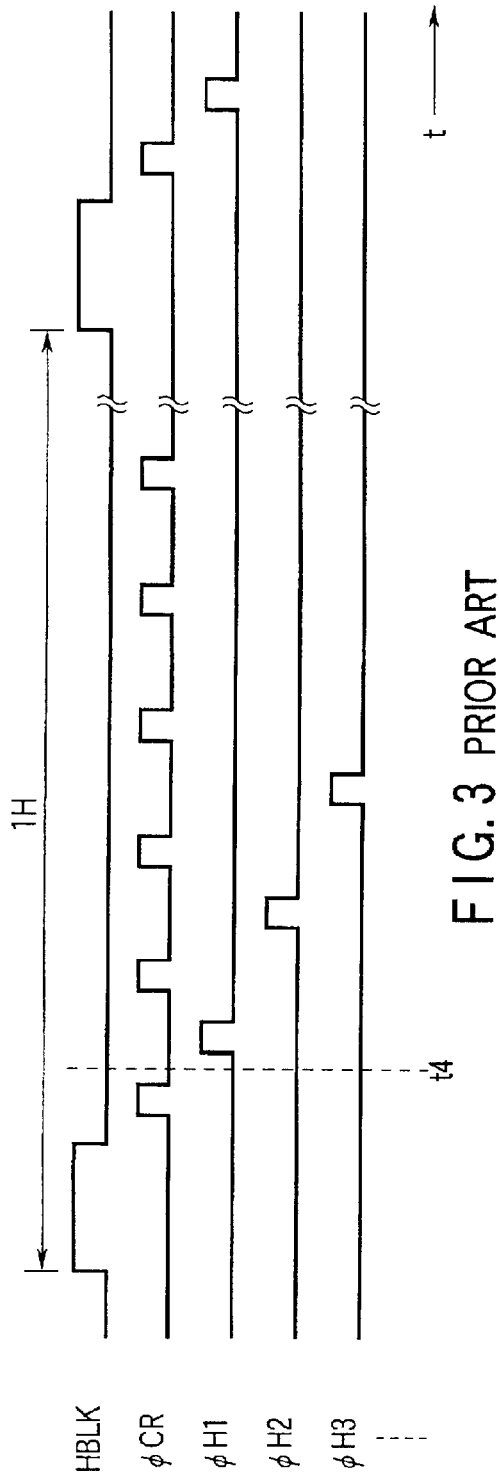
FIG. 3 is a timing chart showing the correlation between the conventional horizontal readout pulse and clear pulse in the solid-state imaging device shown in FIG. 1.
Figure 5:
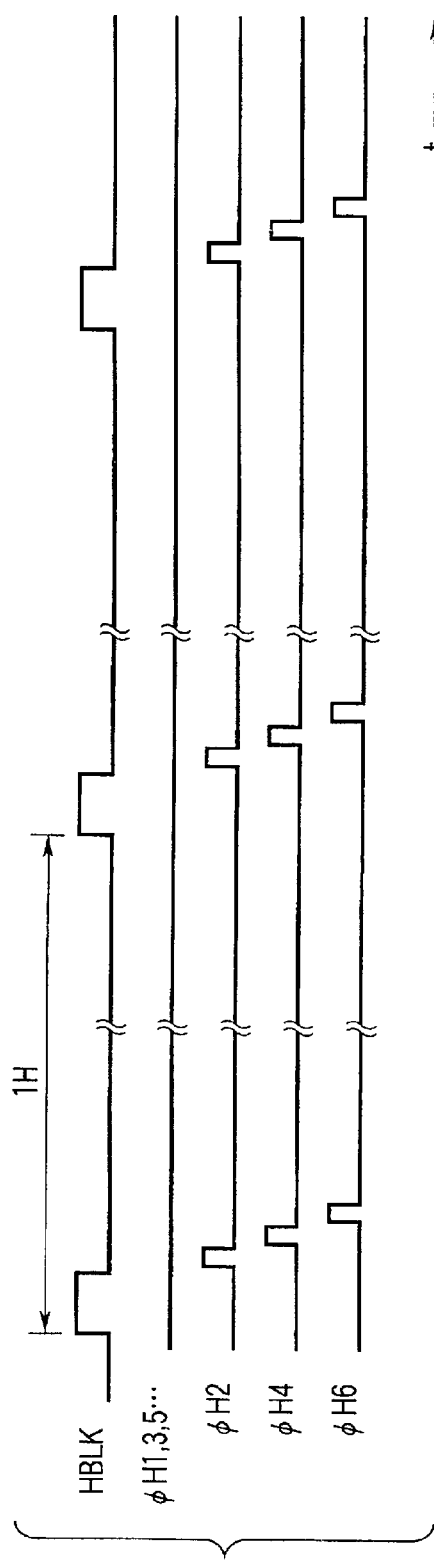
FIG. 5 is a timing chart showing other pulse timings considered when driving the solid-state imaging device shown in FIG. 1 at high speed.

If the signal LA is supplied to the input terminal 31, the high-resolution mode is set, the same operation as in the conventional case described with reference to the timing charts of FIGS. 2 and 3 is performed, and charges are individually read out from the photodiodes 1—1, 1-2 provided in each unit cell P(i,j).

Figure 7:
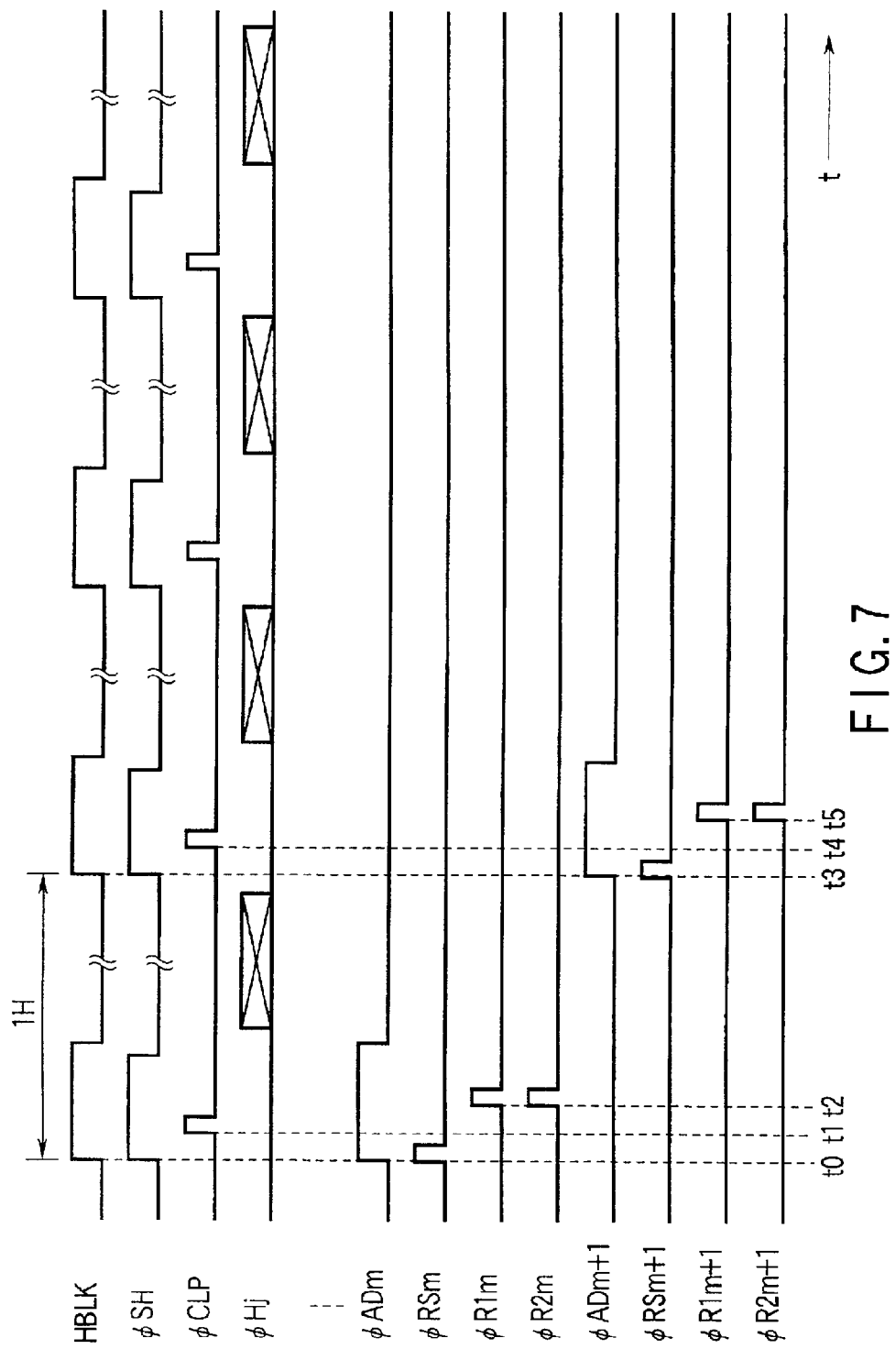
FIG. 7 is a timing chart for illustrating the readout operation of the solid-state imaging device according to the first embodiment of this invention.

If the signal HA is supplied to the input terminal 32, the high-speed driving mode is set, second readout pulses φR2m, φR2m+1 are set to the high level at the same timing as first readout pulses φR1m, φR1m+1 as shown in the timing chart of FIG. 7 so as to simultaneously drive the readout transistors 2-1 and 2—2. As a result, light incident on the photodiodes 2-1, 2—2 is photoelectricaly converted and charges thus produced are added together in the storage node 3 and read out.

Next, the readout operation in the high-speed driving mode in the m-th row of the unit cells is explained by taking the unit cell P(m, n−1) as an example.

Charges produced by photoelectrically converting light incident on the photodiodes 1—1, 1-2 are stored in the photodiodes 1—1, 1-2 until the readout transistors 2-1, 2—2 are turned ON. The operation which is first effected in the horizontal scanning retrace interval is to set the address pulse φADm to the high level so as to turn ON the address transistor 6 (t=t0) and construct a source-follower circuit by use of the vertical signal line Sn-1, current source In-1 and potential detecting transistor 5 so that the charge of the storage node 3 can be detected by use of the potential detecting transistor 5. As a result, only a potential determined by the gate potential of the potential detecting transistor 5 and corresponding to the charge amount of the storage node 3 is transmitted to the vertical signal line Sn-1.

Further, a dark current integrated value stored in the storage node 3 can be discharged by setting the reset pulse φRSm to the high level to turn ON the reset transistor 4 at the beginning of the horizontal scanning retrace interval. Thus, the storage node 3 can be set at the power supply voltage value (Vdd).

At this time, a shift pulse φSH is output from the pulse generating section 21 and supplied to the gates of the shift transistors SHj to turn ON the shift transistors SHj.

Next, at the time t=t1, a clamp pulse φCLP is supplied from the pulse generating section 21 to the gates of the clamping transistors CLPj to turn ON the clamping transistors CLPj and perform the offset elimination process.

At the time t=t2, the readout pulses φR1m, φR2m are set to the high level to substantially simultaneously turn ON the readout transistors 2-1 and 2—2 so that charges stored in the photodiodes 1—1, 1-2 can be transferred to and added together in the storage node 3. The amount of charges stored in the storage node 3 is detected by the potential detecting transistor 5 and a potential corresponding to the detected charge amount is generated and transmitted to the vertical signal line Sn-1.

The operation after this is the same as in the conventional high-resolution mode.

Next, at the time t=t3, t4, t5, the readout operation for the next row ((m+1)th row) of the unit cells adjacent to the above row is effected in the same manner as described above.

Figure 4:
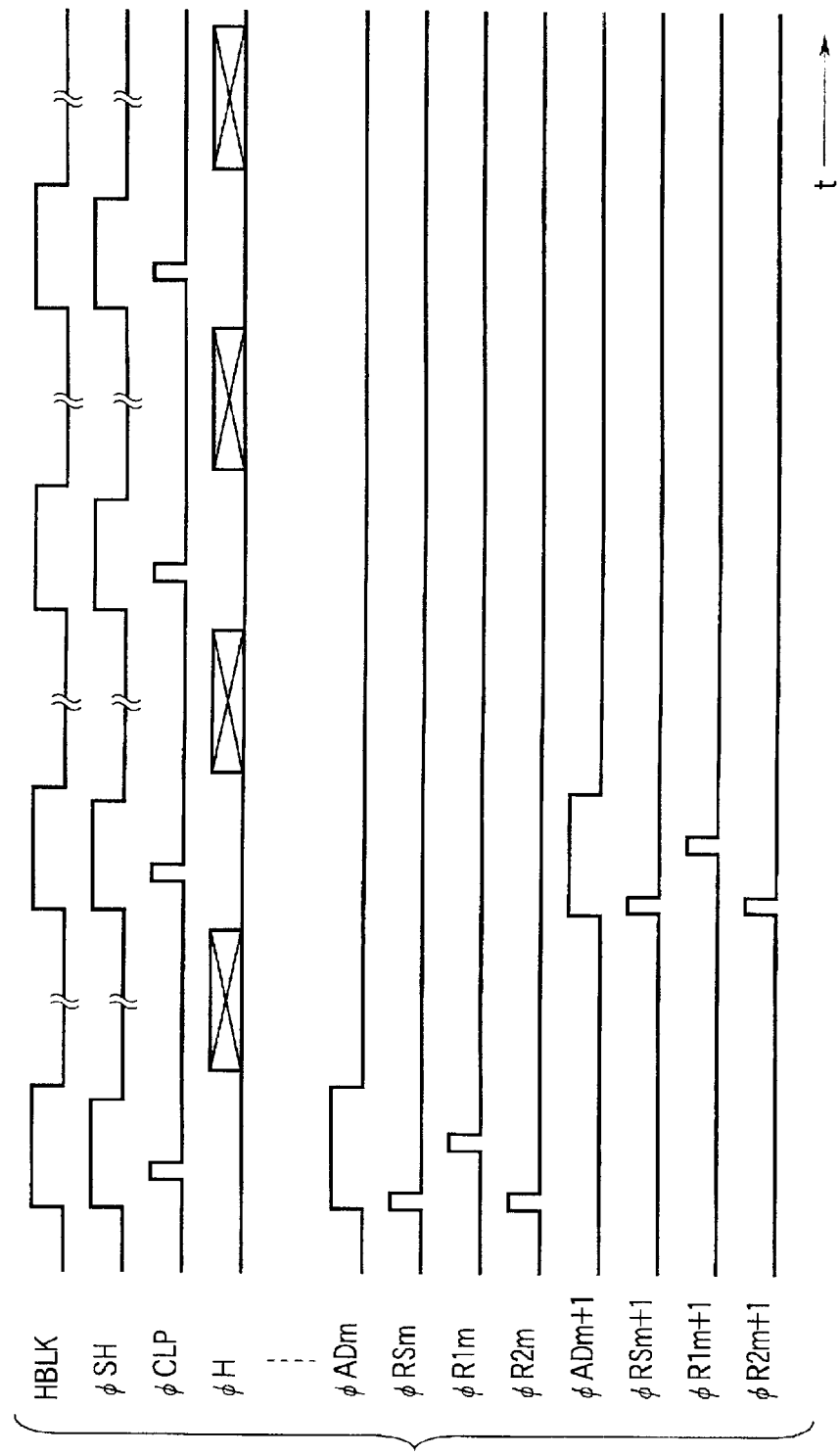
FIG. 4 is a timing chart showing pulse timings considered when driving the solid-state imaging device shown in FIG. 1 at high speed.

That is, in the first embodiment, signal charges are simultaneously read out from the two photodiodes 1—1, 1-2 in each unit cell P(i,j) and supplied to the storage node 3 in the high-speed driving mode. As a result, the readout time for one frame is reduced by half in the same manner as in the case of FIG. 4, but in this case, the sum of the signal charges derived from the photodiodes 1—1, 1-2 is treated as one signal. Therefore, a lowering in the S/N ratio can be suppressed in comparison with the conventional technique in which the signal charge derived from one of the photodiodes is discharged via the reset transistor 4 and a lowering in the sensitivity can be suppressed since the signal charge amount is increased.

[Second Embodiment]

Figure 8:
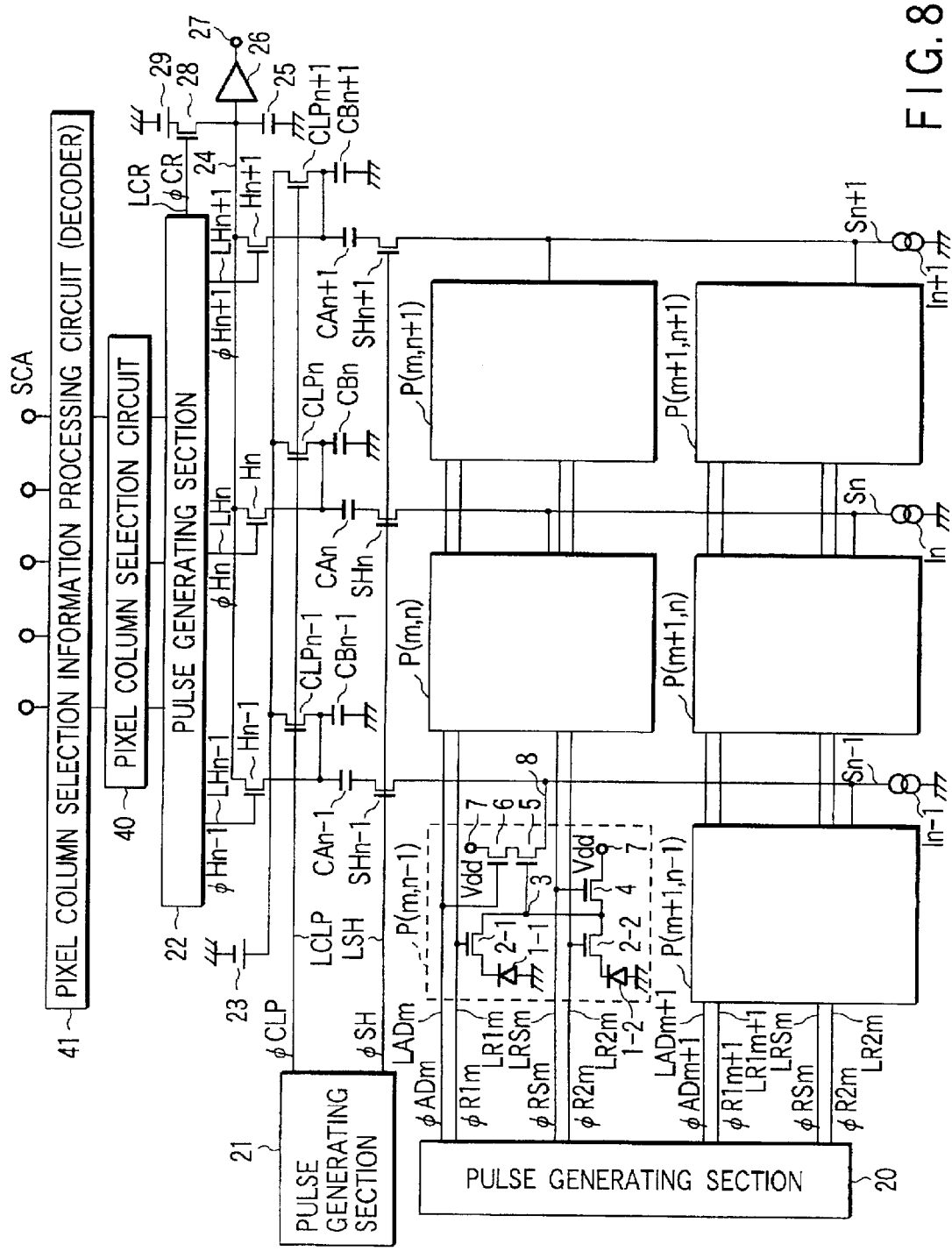
FIG. 8 is a circuit diagram for illustrating a solid-state imaging device according to a second embodiment of this invention.

FIG. 8 is a circuit diagram for illustrating a solid-state imaging device according to a second embodiment of this invention. The circuit is similar to that of FIG. 6 except that a pixel column selection circuit 40 and pixel column selection information processing circuit (decoder) 41 are provided instead of the pixel row selection switching circuit 30 and input terminals 31, 32 in the circuit of FIG. 6. A signal SCA for selecting a pixel column is supplied to and decoded by the pixel column selection information processing circuit 41 and the decoded signal SCA is supplied to the pixel column selection circuit 40. The pixel column selection circuit 40 controls the pulse generating section 22 and causes the pulse generating section 22 to output a horizontal readout pulse at different timings according to the high-resolution mode and high-speed driving mode.

Since the other basic construction is the same as that of the circuit of FIG. 6, like portions are denoted by the same reference numerals and the explanation therefor is omitted.

Figure 9:
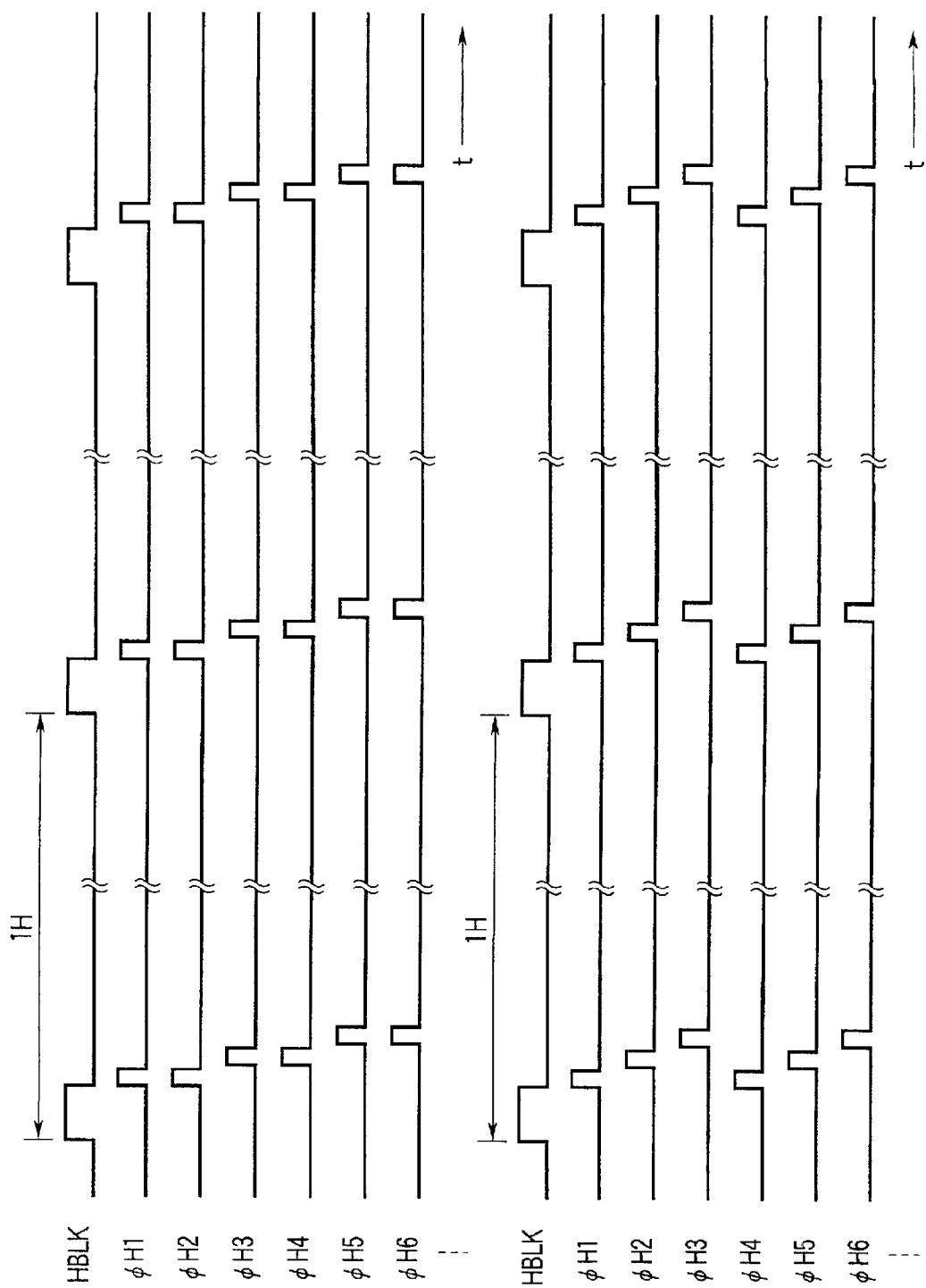
FIG. 9 is a timing chart for illustrating the readout operation of the solid-state imaging device according to the second embodiment of this invention.

FIG. 9 is a timing chart for illustrating the solid-state imaging device shown in FIG. 8. Like the first embodiment, in the second embodiment, the high-resolution mode and high-speed driving mode are selectively switched. However, in the second embodiment, a horizontal readout pulse $\phi$Hj supplied to the gate of a horizontal readout transistor Hj and a horizontal readout pulse $\phi$Hj+1 supplied to the gate of an adjacent horizontal readout transistor Hj+1 are simultaneously set to the high level to simultaneously turn ON the two adjacent horizontal readout transistors Hj, Hj+1 by controlling the pulse generating section 22 by use of the pixel column selection circuit 40 and pixel column selection information processing circuit 41. For example, by simultaneously setting the horizontal readout pulses $\phi$H1 and $\phi$H2, $\phi$H3 and $\phi$H4, $\phi$H5 and $\phi$H6, . . . to the high level, signals are simultaneously read out from the adjacent columns of the unit cells, supplied to and averaged in the horizontal signal line 24 and then the averaged value is output from the output terminal 27 via the output buffer circuit 26.

In order to simplify the explanation, it is assumed that there is no variation in the capacitances of the capacitors CAj, CBj and the capacitance Cij, they are respectively denoted by CA, CB, C, charges read out to the storages node 3 are denoted by Qj, Qj+1, and charges stored in the capacitors CB are denoted by Q2j, Q2j+1. Then, the following equations are obtained.

$$Q2j = CBVref + mQj/C \cdot CACB/(CA+CB) \quad (10)$$

$$Q2j+1 = CBVref + mQj+1/C \cdot CACB/(CA+CB) \quad (11)$$

Therefore, if the horizontal readout transistors Hj, Hj+1 are simultaneously turned ON, the potential of the horizontal signal line 24 can be set as expressed by the following equation (12).

$$(Q1 + Q2j + Q2j + 1)/(CH + 2CB) = \\ (CH \cdot Vb + 2CBVref)/(CH + 2CB) + \\ m(Qj + Qj + 1)/C \cdot CACB/(CA + CB) \cdot (CH + 2CB) \quad (12)$$

As is understood from the equation (12), an output signal derived by averaging signal charges read out from the two selected photodiodes is obtained in the horizontal signal line 24. As a result, like the first embodiment, the readout time for one frame can be reduced by half.

In addition, since the average of the signal charges obtained from the two photodiodes provided in each of the adjacent unit cells is treated as one signal so that the signal charge amount can be increased in comparison with a case where the number of readout photodiodes is reduced, the S/N ratio can be improved.

[Third Embodiment]

Figure 10:
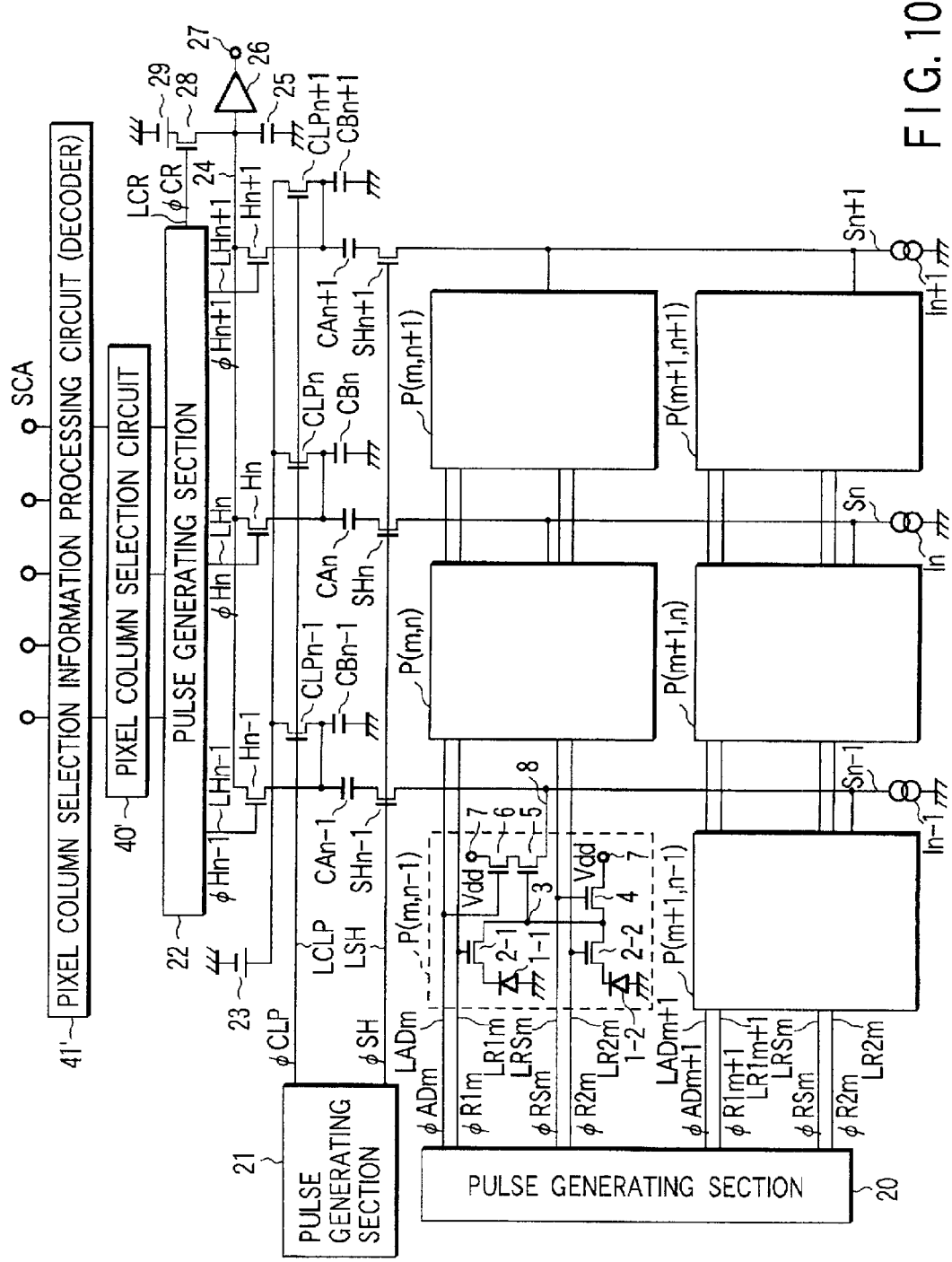
FIG. 10 is a circuit diagram for illustrating a solid-state imaging device according to a third embodiment of this invention.

FIG. 10 is a circuit diagram for illustrating a solid-state imaging device according to a third embodiment of this invention. The circuit is basically similar to that of FIG. 8 except that the control operation for controlling the pulse generating section 22 by use of a pixel column selection circuit 40' and pixel column selection information processing circuit (decoder) 41' is different, and as shown in the timing chart of FIG. 11, horizontal readout transistors arranged for every three unit cells are turned ON at the same timing. That is, signal charges are simultaneously read out from every third columns of unit cells by simultaneously setting the horizontal readout pulses $\phi$H1 and $\phi$H4, $\phi$H2 and $\phi$H5, $\phi$H3 and $\phi$H6, to the high level and the average value thereof is output.

Therefore, the average value is output at the pulse repetition rate of the horizontal readout pulse. The readout method described in the third embodiment is preferable for a construction (RGB stripe filter) in which color filters corresponding to RGB are arranged in a stripe form. The other basic construction, operation and effect are the same as those described with reference to FIG. 8.

A solid-state imaging device for averaging signals read out from a plurality of vertical signal lines and outputting the averaged value is known in the art. As this type of solid-state imaging device, an example for effecting the operation (high-resolution mode) for independently and sequentially scanning outputs of individual photodiodes arranged on the same row in the horizontal direction and outputting the same and effecting the operation (high-speed driving mode) for sequentially scanning the average of outputs of two adjacent photodiodes in the horizontal direction and outputting the same is already disclosed in Jpn. Pat. Appln. KOKAI Publication No. 10-4520.

In FIGS. 2 and 3 in the above Jpn. Pat. Appln. KOKAI Publication, the technique for obtaining an image in two operation modes by capacitively coupling readout signals with output terminals $VO2_{k-1}$, $VO2_k$ provided for the high-resolution mode via switching transistors $252_1$, $252_2$ after they are subjected to impedance conversion, clamping process and sample-hold process for each line and then passed through buffer amplifiers $251_1$, $251_2$, capacitively coupling the readout signal with an output terminal $VO_k$ provided for the high-speed driving mode via switching transistors $253_1$, $253_2$ and sequentially scanning them as required is disclosed.

The above technique is similar to the present invention in that the average of outputs of a plurality of vertical signal lines is output, but this embodiment has the following advantages over the above Jpn. Pat. Appln. KOKAI Publication owing to a difference between the methods for realizing the techniques.

(1) The common switches (readout transistors Hj) used at the outputting time for each column are used at the average outputting time and generation of fixed pattern noise caused by using different switching transistors can be prevented.

(2) The columns subjected to the averaging process can be selected simply by changing the timings for driving the readout transistors Hj and it is unnecessary to output the signal to the horizontal signal line 24 by capacitive coupling at the average outputting time as in the technique described in the above Jpn. Pat. Appln. KOKAI Publication.

(3) Particularly, when the average of outputs from the vertical signal lines which are not adjacent to each other is taken, it is necessary to make capacitive coupling over the signal line in the technique described in the above Jpn. Pat. Appln. KOKAI Publication and a problem of signal crosstalk occurs. This develops into a serious problem particularly in a case where the average is taken by use of a color sensor using RGB stripe filters, but such a problem does not occur in the third embodiment.

[Fourth Embodiment]

One of the basic ideas of this invention is that a potential signal corresponding to the average value of outputs from vertical signal lines corresponding to the selected horizontal readout transistors can be obtained on the horizontal signal line when preset timing is set to turn ON some of the horizontal readout transistors at the same time.

Before explaining the fourth embodiment, the above idea is described in detail. Assume now that the capacitance of an i-th storage node (3 in FIG. 6) corresponding to a j-th vertical signal line Sj is set to Cij as in the equation (1). An amount of charges transferred from a pixel to the storage node 3 is set to Qij since there is a possibility that the charge amount may be different for each node. At this time, the potential Vij of the vertical signal line Sj is expressed by the following equation (13).

$$Vij = mQij/Cij + mVdd + V0ij \quad (13)$$

where m indicates the modulation degree of the transistor, and V0ij indicates a threshold voltage of the transistor 5 and expresses an offset voltage determined by a variation in the current source Ij. By using the above symbols, the charge amount Q2j corresponding to the equation (8), that is, the amount of charges stored in the capacitor CBj is expressed as follows.

$$Q2j = CBj Vref + mQij/Cij \cdot CAjCBj/(CAj+CBj) \quad (14)$$

At this time, if some of the horizontal readout transistors Hj are simultaneously turned ON, the potential V of the horizontal signal line 24 is expressed by the following equation (15) in correspondence to the equation (9) while it is assumed that $\Sigma$ expresses the sum of charges associated with the readout transistors which are simultaneously turned ON.

$$V = (CH \cdot Vb + \sum Q2j)/(CH + \sum CBj) \quad (15)$$
$$= (CH \cdot Vb + \sum VrefCBj)/(CH + \sum CBj) +$$
$$\sum mQij/Cij \cdot CAjCBj/(CAj+CBj) \cdot (CH + \sum CBj)$$

As already explained, the ratio of capacitances results in the ratio of the geometrical sizes and is a relatively easily controllable amount. If the number of readout transistors which are simultaneously turned ON is N and the subscript j is omitted from the capacitors CAj, CBj with the above fact taken into consideration, the potential V can be expressed as follows.

$$V = (CH \cdot Vb + NVrefCB)/(CR + NCB) + [CACB/(CA+CB) \cdot (CH/N+CB)] \cdot [(1/N)m\Sigma Qij/Cij] \quad (16)$$

That is, it is obtained as a signal derived by adding an average signal output $(1/N)m\Sigma Qij/Cij$ times a constant number to a preset amount $(CH \cdot Vb + NVrefCB)/(CH + NCB)$. Thus, the average value for a desired number of vertical signal lines can be detected. When all of the horizontal readout transistors are simultaneously turned ON, it is supposed that N is sufficiently larger than 1 and the equation (16) can be rewritten as follows.

$$V = Vref + CA/(CA+CB)(1/N)m\Sigma Qij/Cij \quad (17)$$

This corresponds to an equation attained by setting CH=0 and replacing mQ/Cij by the average value $(1/N)m\Sigma Qij/Cij$ for one row in the equation (9).

Next, the fourth embodiment of this invention is explained with reference to the solid-state imaging device of FIG. 6 and the timing chart of FIG. 12. The fourth embodiment is suitable for AGC for controlling the shutter speed and diaphragm opening to attain adequate exposure of a video camera, electronic still camera or the like by using the average value of readout signal charges as described above.

Generally, in a solid-state imaging device capable of effecting the electronic shutter operation, a pulse generating section for an electronic shutter is provided in addition to the readout pulse generating sections 20, 21, 22 as shown in FIG. 6. Like the pulse generating section 20 used as the vertical driving circuit, the pulse generating section for the electronic shutter outputs various pulse signals to scan unit cell rows to be selected at preset timings. The pulse generating section for the electronic shutter and the pulse generating section used as the vertical driving circuit are constructed by use of shit registers, for example. Specific to-be-selected rows are selected and controlled at two timings in one field period by the pulse generating section for the electronic shutter and the pulse generating section used as the vertical driving circuit.

The electronic shutter operation for controlling the light receiving time can be equivalently attained by causing the pulse generating section for the electronic shutter to selectively control the to-be-selected row and start storage of a pixel signal before the pulse generating section used as the vertical driving circuit selectively controls the to-be-selected row and reads out a pixel signal to the vertical signal line.

However, since the electronic shutter operation is a known technique and this embodiment is not directly related to the electronic shutter operation, the detail explanation for the basic construction and the operation is omitted here.

Figure 12:
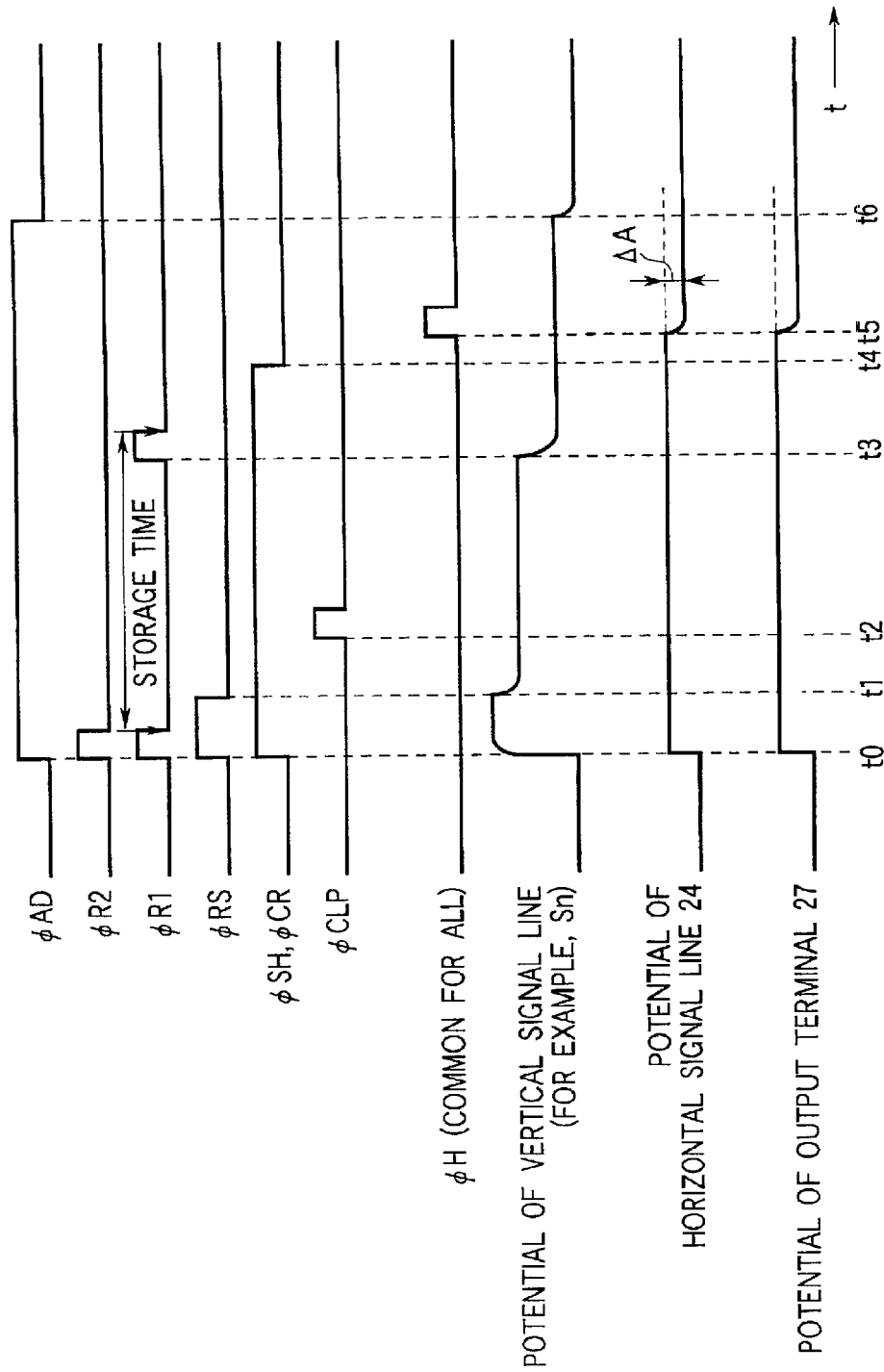
FIG. 12 is a timing chart for illustrating the readout operation of a solid-state imaging device according to a fourth embodiment of this invention.

The timing chart shown in FIG. 12 illustrates a determination method of illuminance on the sensor surface for determining proper storage time (shutter speed) or diaphragm opening and is set to detect the average output of a preset representative row (for example, one row at the center of the sensor surface) before driving the sensor. In FIG. 12, the timings of various pulse signals are shown with attention paid only to a to-be-selected row.

That is, first, at the time t=t0, the address pulse $\phi$AD, readout pulses $\phi$R1, $\phi$R2 and reset pulse $\phi$RS generated from the pulse generating section 20 are set to the high level, and at the same time, the shift pulse $\phi$SH generated from the pulse generating section 2 and the clear pulse φCR generated from the pulse generating section 22 are set to the high level. As a result, the storage node 3 is connected to the Vdd power supply 7 via the reset transistor 4, and therefore, the potential is detected by the potential detecting transistor 5 and the potential of the vertical signal line (for example, Sn) is set to a high potential corresponding to the power supply voltage Vdd. Further, since all of the horizontal readout pulses φH are set at the low level, all of the horizontal readout transistors E are set in the OFF state and since the potential resetting transistor 28 is turned ON according to the high level of the clear pulse φCR, the potential of the horizontal signal line 24 is set to a potential determined by the voltage of the DC power supply 29. Therefore, the potential of the output terminal 27 is set to a potential corresponding to the potential of the horizontal signal line 24.

Next, while the address pulse φAD, shift pulse φSH and clear pulse φCR are kept at the high level, the reset pulse φRS is set to the low level to terminate the reset operation (t=t1). At this time, the reset transistor 4 is turned OFF, the storage node 3 is separated from the power supply 7 and the potential of the vertical signal line Sn is lowered by capacitive coupling.

Next, at the time t=t2, the clamping transistor CLPn is turned ON by supplying the clamp pulse φCLP to the gate thereof and an offset caused by variations in the current source In and the threshold voltage of the potential detecting transistor 5 is eliminated (t=t2) by supplying a preset voltage to the electrode of one of the capacitors CAn, CBn from the DC power supply 23.

After this, when the readout pulse φR1 for the selected row is set to the high level again, the readout transistor 2-1 is turned ON to further lower the potential of the vertical signal line Sn according to the amount of charges stored in the photodiode 1—1 (t=t3).

At the time t=t4, if the shift pulse φSH and clear pulse φCR are set to the low level, all of the shift transistors SH and potential resetting transistor 28 are turned OFF and the unit cells P(i,j) and DC power supply 29 are separated from the horizontal signal line 24.

After this, when all of the horizontal readout pulses φH are set to the high level, all of the horizontal readout transistors H are turned ON, charges stored in the capacitors CA, CB are transferred to the horizontal signal line 24 and the potential of the horizontal signal line 24 is varied by ΔA according to the average value of charges stored in the capacitors CA, CB (t=t5).

Then, at the time t=t6, when the address pulse φAD for the selected row is set to the low level, the address transistor 6 is turned OFF to terminate the readout operation.

In the readout operation described above, the storage time of charges into the storage node 3 is set by the interval of the readout pulse φR1 for the selected row and the potential ΔA of the average value (signal corresponding to the equations (16) and (17)) of sensor outputs corresponding to the storage time for one line of the selected row is output. The average illuminance of the sensor surface is acquired according to the potential ΔA and storage time setting information.

After this, the diaphragm opening or storage time is set according to the thus obtained average illuminance and then the normal operation is effected.

Thus, the average illuminance of the sensor surface can be acquired by effecting the simple driving operation without performing the readout operation for all of the pixels. Further, an external memory is not necessary.

It is possible to combine the fourth embodiment with the first embodiment so as to use the sum of the charges read out from the two photodiodes of one unit cell as an output signal. In this case, the readout pulses φR1, φR2 input to each unit cell as readout pulses for the selected row can be driven substantially at the same timing.

In the above embodiments, a case wherein two photodiodes are provided in each unit cell is explained, but the number of photodiodes is not limited to two. For example, in the solid-state imaging device of the second to fourth embodiments, one photodiode may be provided.

As described above, according to one aspect of this invention, a solid-state imaging device capable of suppressing a lowering in the S/N ratio when the high-speed driving operation is effected can be attained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A solid-state imaging device comprising:
   an imaging area having unit cells arranged in a two-dimensional fashion on a semiconductor substrate, each of the unit cells including first and second photoelectric conversion/storage sections for photoelectrically converting incident light and storing charges thus generated, first and second charge readout circuits for transferring charges stored in the first and second photoelectric conversion/storage sections to a common charge detecting section, a potential detecting circuit for detecting charges transferred to the charge detecting section, generating a potential corresponding to an amount of detected charges and transmitting the potential to a corresponding one of vertical signal lines, a reset circuit for discharging the charges transferred to the charge detecting section, and an address circuit for selectively activating the potential detecting circuit;
   a vertical driving circuit provided in correspondence to each pixel row of said imaging area, for driving the first and second charge readout circuits, reset circuit and address circuit of each of the unit cells at preset timings;
   signal processing circuits respectively attached to the vertical signal lines which are provided for respective columns of the unit cells, for performing required signal processes;
   a horizontal driving circuit for scanning outputs of said signal processing circuits in a horizontal direction at preset timings to detect the same; and
   an output circuit for outputting output signals of said signal processing circuits detected by the scanning operation by said horizontal driving circuit;
   wherein the solid-state imaging device has a first operation mode in which the first and second charge readout circuits are driven at substantially the same timing by said vertical driving circuit, the charges stored in the first and second photoelectric conversion/storage sections are transferred to and added together in the charge detecting section, and the potential detecting circuit detects the added charges, generates and transmits a potential corresponding to an amount of detected charges to the vertical signal line, and outputs the potential from said output circuit via said signal processing circuits.

2. The solid-state imaging device according to claim 1, which further comprises a pixel row selection switching section for controlling said vertical driving circuit based on a signal for specifying the first operation mode and a signal for specifying a second operation mode and in which the first and second charge readout circuits are driven by said vertical driving circuit at substantially the same timing in the first operation mode and the first and second charge readout circuits are driven by said vertical driving circuit at different timings in the second operation mode.

3. The solid-state imaging device according to claim 1, wherein said vertical driving circuit includes a pulse generating section for outputting an address pulse, first and second readout pulses and reset pulse.

4. The solid-state imaging device according to claim 1, wherein each of said signal processing circuits includes a noise canceller circuit.

5. A readout method of a solid-state imaging device which includes an imaging area having unit cells arranged in a two-dimensional fashion on a semiconductor substrate, each of the unit cells including first and second photoelectric conversion/storage sections for photoelectrically converting incident light and storing charges thus generated, first and second charge readout circuits for transferring charges stored in the first and second photoelectric conversion/storage sections to a common charge detecting section, a potential detecting circuit for detecting charges transferred to the charge detecting section, generating a potential corresponding to an amount of detected charges and transmitting the potential to a corresponding one of vertical signal lines, a reset circuit for discharging the charges transferred to the charge detecting section, and an address circuit for selectively activating the potential detecting circuit; a vertical driving circuit provided in correspondence to each pixel row of the imaging area, for driving the first and second charge readout circuits, reset circuit and address circuit of each of the unit cells at preset timings; signal processing circuits respectively attached to the vertical signal lines which are respectively provided for columns of the unit cells, for performing required signal processes; a horizontal driving circuit for scanning outputs of the signal processing circuits in a horizontal direction at preset timing to detect the same; and an output circuit for outputting output signals of the signal processing circuits detected by the scanning operation by the horizontal driving circuit; comprising the steps of:

driving the first and second charge readout circuits at substantially the same timing by use of the vertical driving circuit;

transferring the charges stored in the first and second photoelectric conversion/storage sections to the charge detecting section and adding the charges together;

detecting the added charges by use of the potential detecting circuit;

generating a potential corresponding to an amount of the detected charges and transmitting the potential to the vertical signal line; and outputting the potential from the output circuit via the signal processing circuit.

* * * * *